United States Patent [19]
Cruver

[11] Patent Number: 5,147,027
[45] Date of Patent: Sep. 15, 1992

[54] ARTICLE GROUP-SEGREGATING APPARATUS AND METHOD

[75] Inventor: Michael Cruver, Port Townsend, Wash.

[73] Assignee: Formost Packaging Machines, Inc., Woodinville, Wash.

[21] Appl. No.: 830,536

[22] Filed: Jan. 31, 1992

Related U.S. Application Data

[60] Continuation of Ser. No. 661,742, Feb. 27, 1991, abandoned, which is a division of Ser. No. 256,899, Oct. 13, 1988, Pat. No. 5,012,916.

[51] Int. Cl.⁵ ............................................. B65G 47/26
[52] U.S. Cl. ............................. 198/419.3; 198/418.1
[58] Field of Search ................. 198/418.1, 419.2, 419.3

[56] References Cited

U.S. PATENT DOCUMENTS

| | | | |
|---|---|---|---|
| 1,976,855 | 10/1934 | McKee et al. | 198/419.2 |
| 2,571,790 | 10/1951 | Tomkins | 198/419.2 |
| 3,155,221 | 11/1964 | Griner | 198/419.3 |
| 3,178,007 | 4/1965 | Standley et al. | 198/419.3 |
| 3,194,382 | 7/1965 | Nigrelli et al. | 198/419.3 |
| 3,368,660 | 2/1968 | Standley et al. | 198/419.3 |
| 3,823,813 | 7/1974 | Holt | 198/418.1 |
| 3,872,647 | 3/1975 | Langen et al. | 53/157 |
| 3,938,650 | 2/1976 | Holt | 198/419.3 |
| 4,041,677 | 8/1977 | Reid | 53/159 |
| 4,098,392 | 7/1978 | Greene | 198/419.3 |
| 4,360,098 | 11/1982 | Nordstrom | 198/418.1 |
| 4,443,995 | 4/1984 | Myers et al. | 198/419.3 X |
| 4,552,261 | 11/1985 | Raudat et al. | 198/419.3 |
| 4,564,104 | 1/1986 | Anderson | 198/419.3 |
| 4,630,725 | 12/1986 | Steurmer | 198/419.1 |
| 4,637,509 | 1/1987 | Raudat et al. | 198/419.3 |

FOREIGN PATENT DOCUMENTS

| | | | |
|---|---|---|---|
| 0921499 | 2/1973 | Canada | 198/418.1 |
| 2166209 | 5/1973 | Fed. Rep. of Germany | 198/419.3 |

Primary Examiner—Robert P. Olszewski
Assistant Examiner—James R. Bidwell
Attorney, Agent, or Firm—Robert W. Beach

[57] ABSTRACT

Article group-segregating mechanism having a plurality of orbiting pusher members includes a conveyor for pushing a row of articles against an orbiting pusher member and a clamping conveyor or clamp arms for arresting movement of the row of articles behind a segregated group of articles pushed against such pusher member for enabling such group of articles to be engaged and pushed by the next orbiting pusher member.

2 Claims, 8 Drawing Sheets

ARTICLE GROUP-SEGREGATING APPARATUS AND METHOD

This is a continuation of co-pending application Ser. No. 07/661,742 filed on Feb. 27, 1991, ABN, which is a division of Ser. No. 07/256,899, filed Oct. 13, 1988, issued as Pat. No. 5,012,916 on May 7, 1991.

BACKGROUND OF THE INVENTION

1. Field of the Invention

This invention relates to apparatus for segregating articles into groups from lines or rows of articles moved by a conveyor and to the method of segregating performed by such apparatus.

2. Prior Art

Nigrelli et al. U.S. Pat. No. 3,194,382, issued Jul. 13, 1965, shows apparatus somewhat similar to the apparatus of the present invention but has a different type of metering device for segregating groups of articles from lines or rows of articles.

Other types of apparatus for segregating groups of articles are shown in the following U.S. patents:

McKee et al. U.S. Pat. No. 1,976,855, issued Oct. 16, 1934;
Langen et al. U.S. Pat. No. 3,872,647, issued Mar. 25, 1975;
Reid U.S. Pat. No. 4,041,677, issued Aug. 16, 1977;
Nordstrom U.S. Pat. No. 4,360,098, issued Nov. 23, 1982;
Steurmer U.S. Pat. No. 4,630,725, issued Dec. 23, 1986.

SUMMARY OF THE INVENTION

It is an object to provide an apparatus and a method for segregating groups of articles from supply lines or rows of articles which is adapted to segregate articles that are somewhat nonuniform and can vary in dimensions extending lengthwise of their movement by a conveyor.

It is also an object to provide group-segregating apparatus which can be altered readily to segregate groups of different quantities simply by altering timing of components of the apparatus.

A further object is to provide group-segregating apparatus which is compact and simple in construction.

The foregoing objects can be accomplished by group-segregating apparatus including overhead grouping mechanism, feed mechanism for feeding to such grouping mechanism articles to be grouped into which grouping mechanism travel of articles is arrested periodically by holding or clamping mechanism which interrupts the feed of articles to the grouping mechanism without discontinuing movement of the feeding mechanism.

DETAILED DESCRIPTION

Figure 1:
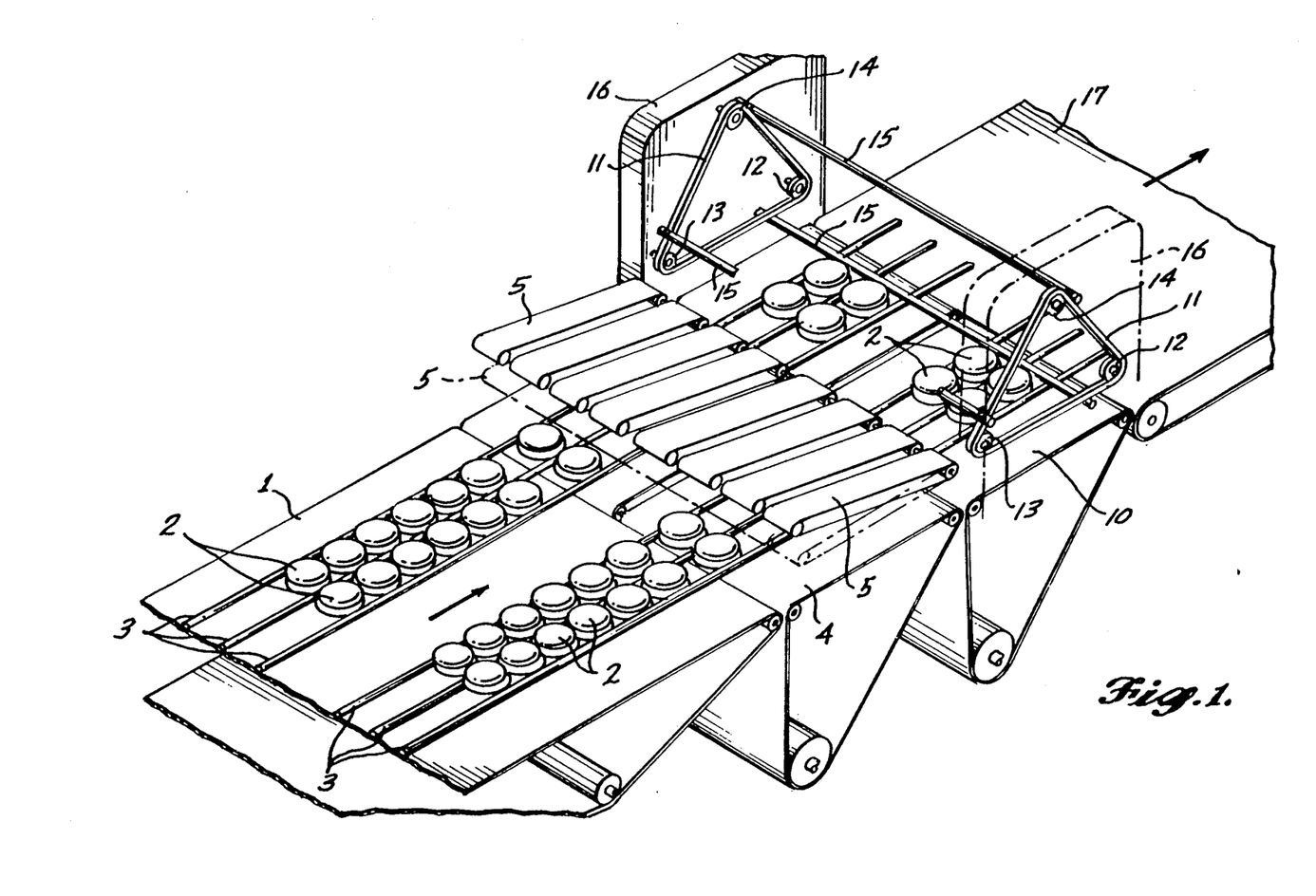
FIG. 1 is a top perspective of article-segregating apparatus according to the present invention.

FIG. 1 shows a belt supply conveyor 1 of a width to transport to the group-segregation apparatus several rows of articles 2 to be segregated into groups, such articles being represented as hamburger buns, for example. Such articles are confined to rows by guide strips 3 extending lengthwise parallel to the direction of movement of the supply conveyor 1 and spaced apart a distance approximately equal to the width of the articles being fed. Alternatively, such guide strips could be ribs formed on the supply conveyor belt 1.

The supply conveyor belt moves the rows of articles to be segregated onto an infeed belt conveyor 4 located below an upper article-holding or hold-down belt 5. The infeed conveyor 4 is clutch-controlled for intermittent operation. The upper holding belt 5 is mounted on pulleys 6 and 7 and pulley 6 is mounted to swing upward from the position shown in FIGS. 2 and 3 to the position shown in FIGS. 4 and 5 about the axis of pulley 7 to lift the belt out of contact with all the articles behind the leading article. The belt 5 can be driven by driving pulley 7 by a belt 8 which in turn can be driven by a pulley 9 when the belt 5 is in its lower position shown in FIGS. 2 and 3 or in its raised position shown in FIGS. 4 and 5.

The control of infeed conveyor 4 and article holding or hold-down belt 5 can be coordinated so that the belt 5 is stooped at the same time that infeed belt 4 is stooped. The holding belt 5 can be driven simultaneously with the infeed belt 4 when the holding belt is in its lower position shown in FIG. 3. When the holding belt is stopped, its pulley 6 can be raised to the position shown in FIG. 4 so that the supply conveyor 1 can feed additional articles onto the infeed belt behind the leading article gripped between the end of the stooped upper belt 5 beneath pulley 7 and the stooped infeed conveyor 4, as indicated in the difference in position of the articles shown in FIGS. 4 and 5.

The infeed conveyor 4 delivers articles to be grouped into the grouping mechanism which, as shown in FIGS. 1 through 5, includes a group-supporting belt 10 and upper belts 11 located at opposite sides of the infeed conveyor 4 and mounted in vertical planes by passing them around mounting pulleys 12, 13 and 14. Upper belts serve as supports for the opposite ends of article group forming rods 15 which bridge between the belts 11. Travel of such upper belts 11 moves such group-forming rods around an orbit including one leg located parallel to and close above the flat upper stretch of group-supporting belt 10.

One or more of the pulleys 12, 13 and 14 are driven by a drive mechanism housed within casing 16. The group-forming rods some groups of articles on the group-supporting belt 10 for movement onto the outfeed belt 17.

In operation the supply conveyor 1 moves continuously, but its surface is smooth so that, when movement of the buns beyond the supply conveyor is arrested by the holding belt, the supply conveyor will slip beneath the buns but will move them forward onto the infeed conveyor 4 whenever resistance to their movement is discontinued.

Figure 2:
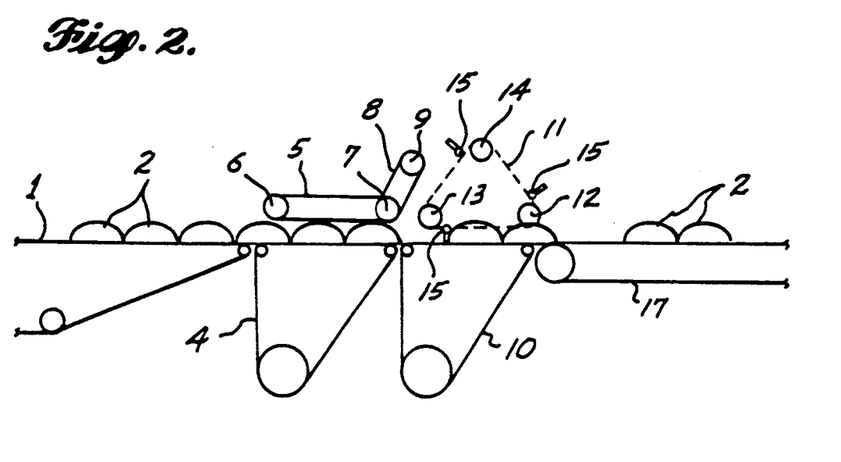
FIG. 2, FIG. 3, FIG. 4 and FIG. 5 are diagrammatic side elevations of the apparatus illustrating its method of operation.
Figure 3:
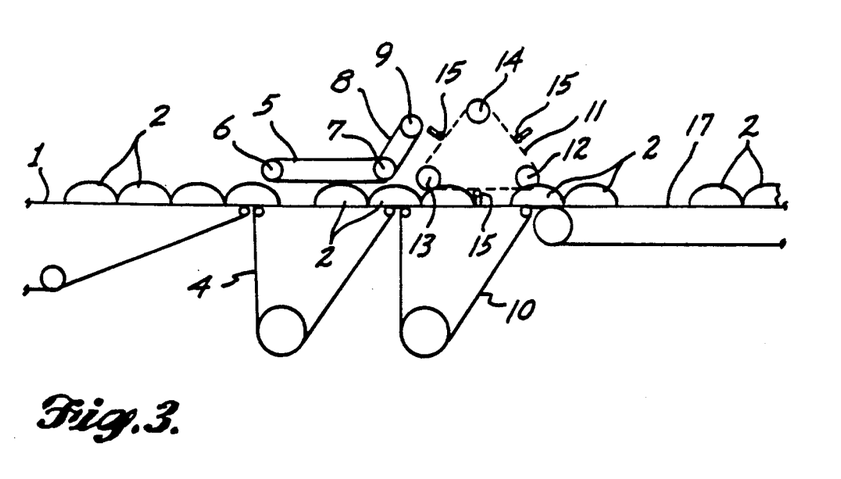

Movement of the articles by the supply conveyor onto the infeed conveyor 4 is arrested when the clutch driving the infeed conveyor is disengaged and the upper belt 5 is stopped either in its lower position engaging the upper sides of the articles, as shown in FIG. 2 or in the raise position of figure. The grouping mechanism runs continuously, and in FIG. 2 a group forming rod 15 is being lowered behind a group of articles on the group-supporting belt 10. As soon as the group forming rod has been lowered to its lowest level, the clutch driving the infeed conveyor 4 is engaged and the holding belt 5 is started. The infeed belt 4 and the holding belt 5 cooperatively push the leading articles forward until the most forward article engages the group forming rod 15 and the articles have been crowded until all spaces between the successive articles have been closed, as shown in FIG. 3. Such feed of belts 4 and 5 continues until the next group has been formed, at which time the infeed belt 4 and the holding belt 5 are stopped to arrest movement of the most forward article in the next group while the group-supporting conveyor 10 continues to move the article group and push it against the group forming pusher rod 15 ahead of it, as shown in FIG. 4.

Figure 4:
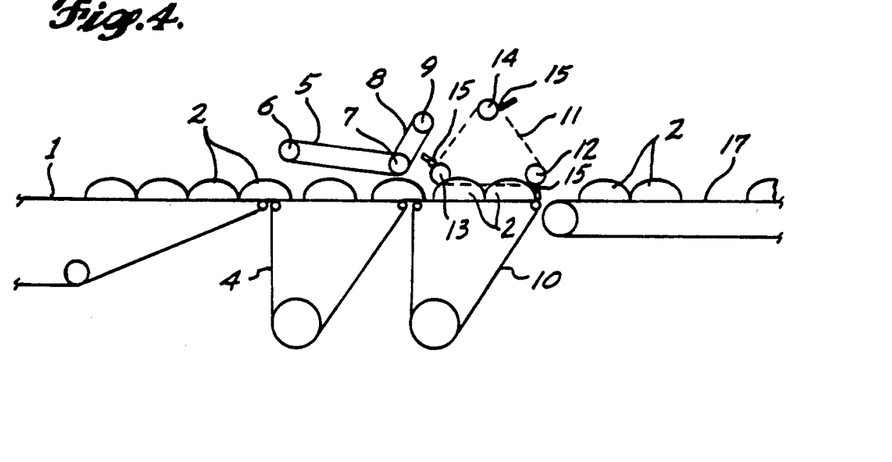
Figure 5:
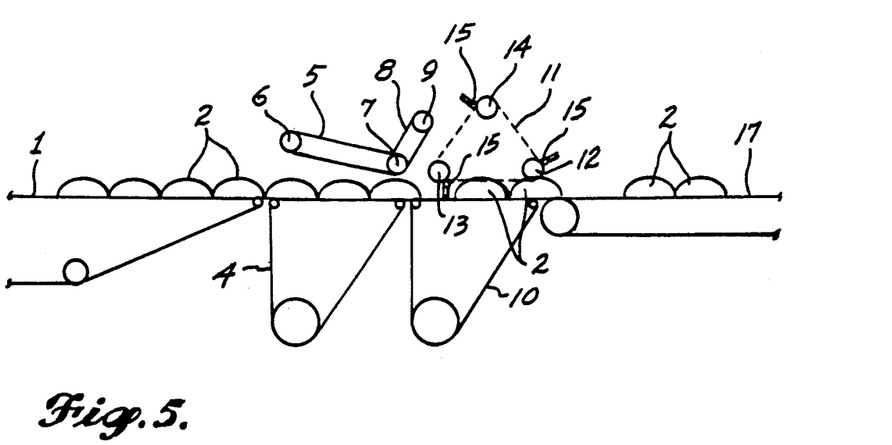

The pulley 6 carrying one end of belt 5 can be raised from the lower position shown in FIG. 3 to the upper position shown in FIG. 4 so that belt 5 will not impede movement of articles 2 by supply conveyor 1 for moving articles on the infeed conveyor 4 into abutment, as shown in FIG. 5, while the conveyors 4 and 5 are stopped. Almost immediately after such bunching has been completed, the next group forming rod 15 will have been moved downward into the lower portion of its orbit and the clutch for driving belt 4 will be reengaged and belt 5 will be started again to move the most forward article on infeed conveyor 4 into engagement with the next group forming rod 15, as shown in FIG. 3. When the next group has been fed onto the group-supporting belt 10, the clutch driving belt 4 will again be disengaged and belt 5 will be stopped to repeat the operation while belt 10 continues to press the next segregated group against rod 15 ahead of it.

Figure 7:
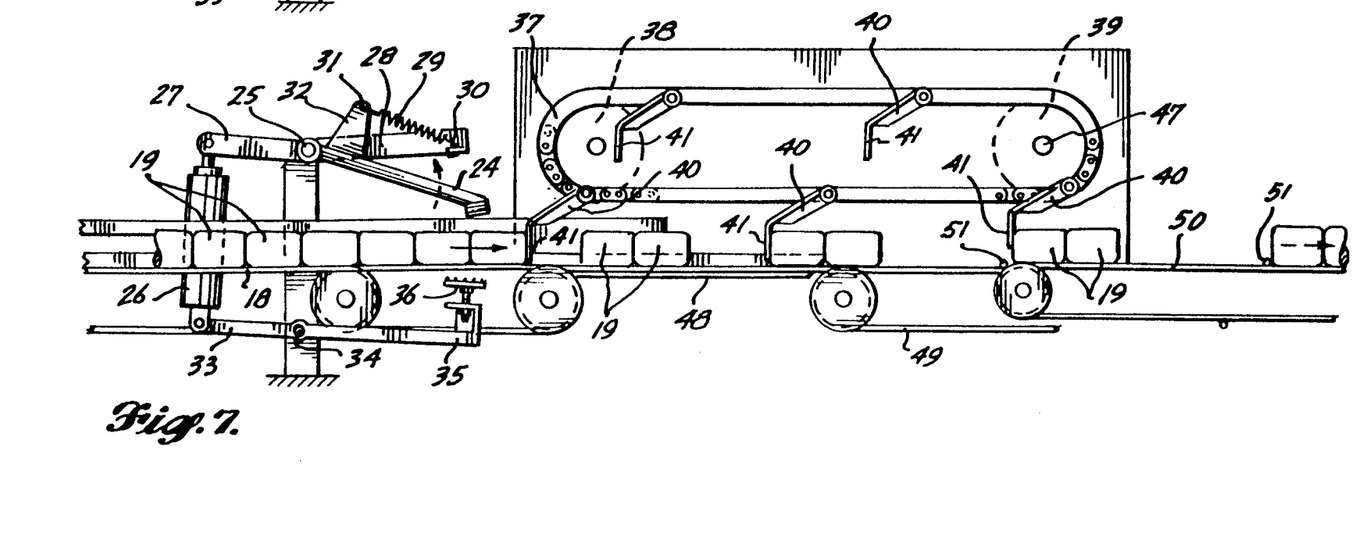
Figure 8:
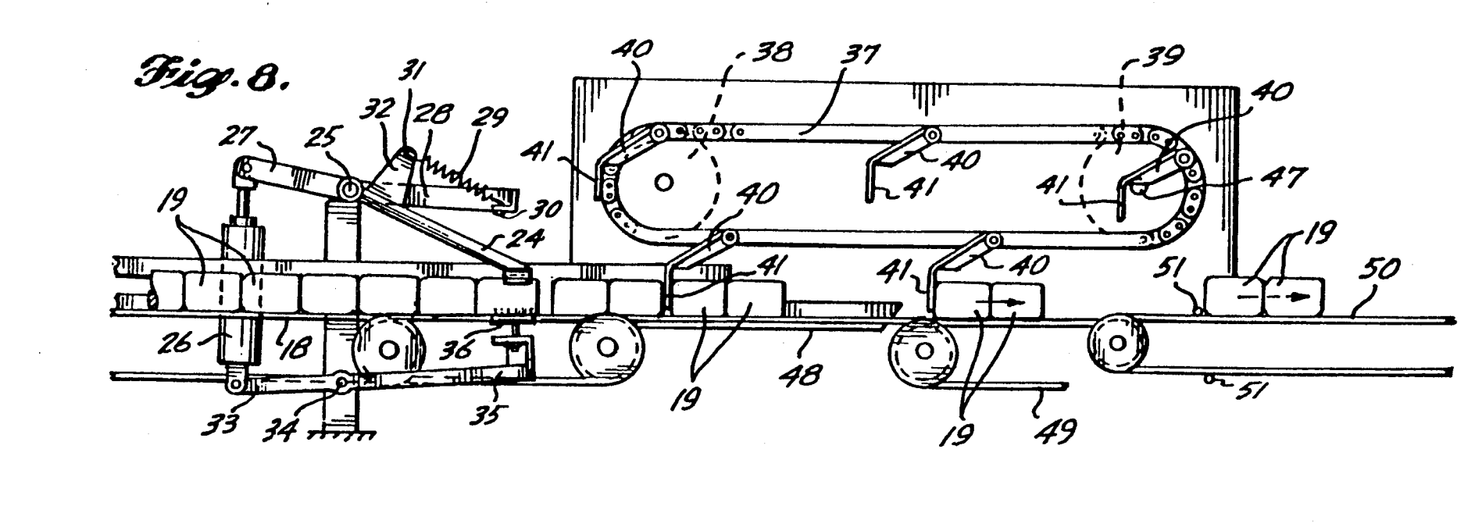
Figure 9:
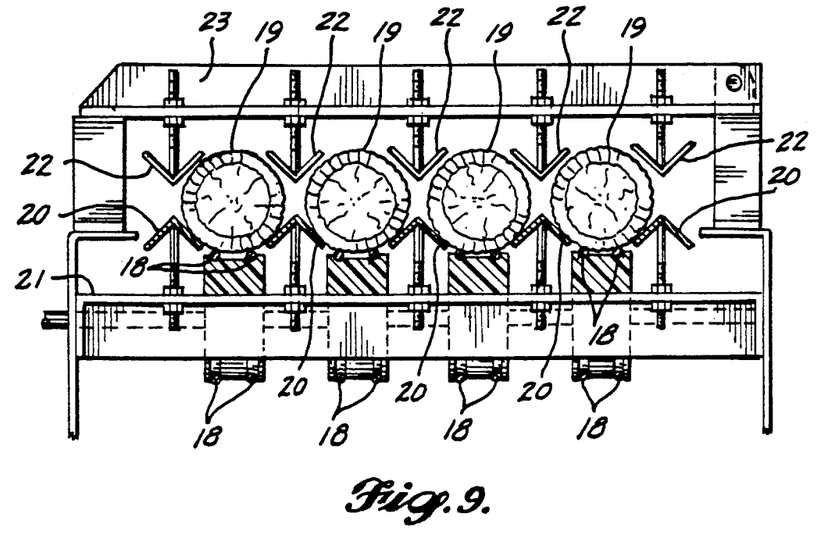
FIG. 9 is a transverse vertical section through a portion of the apparatus shown in FIGS. 6, 7 and 8.
Figure 10:
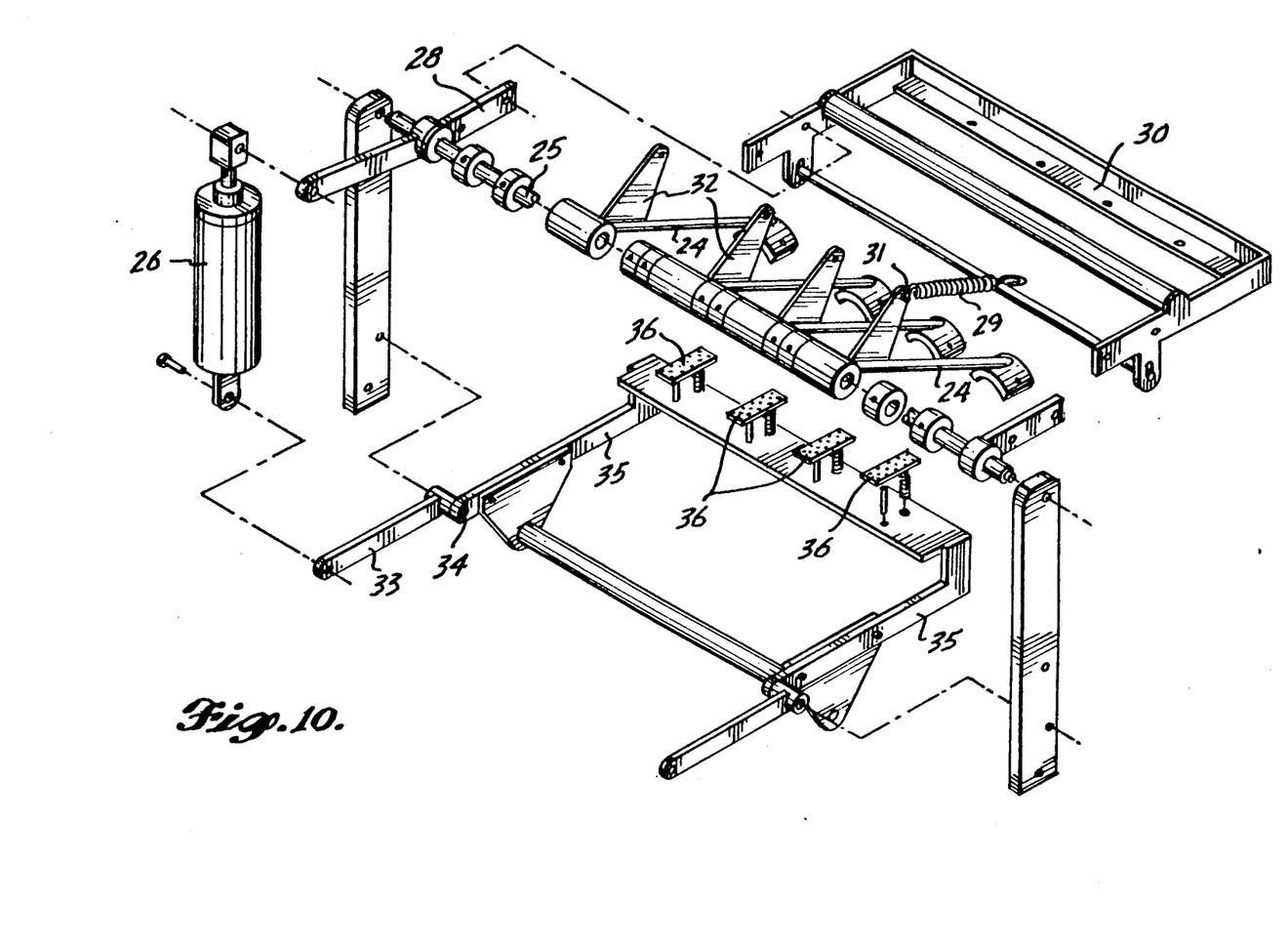
FIG. 10 is an exploded top perspective of clamping mechanism of the apparatus.

The apparatus shown in FIGS. 6 to 11 is generally similar to the apparatus described in connection with FIGS. 1 to 5, but in this instance the articles being segregated into groups are corncob chunks. In order to control their movement by conveyors 18, guide strips 20 adjustably supported from the machine frame 21 are provided, as shown in FIG. 9. Also, upper guide strips 22 adjustably supported from an upper frame member 23 are provided to cooperate with the lower guide strips 20.

In this apparatus, clamping mechanism is provided for the article which is somewhat different from the holding belt 5 described in connection with FIGS. 1 through 5. In this apparatus, a swinging clamp arm 24 is mounted on pivot 25 to be swung by a pneumatic jack 26. The upper end of such jack is pivotally connected to one end 27 of a lever having a pivot fulcrum coinciding with the pivot 25 of arm 24, as shown best in FIG. 10. The opposite end portion 28 of the lever carries a spring 29, one end of which is attached to a frame 30 mounted on the arm 28 of the jack-actuated lever. The other end of spring 29 is connected to the end 31 of a horn 32 mounted on the arm 24.

The arrangement described provides a yielding connection between the jack 26 and the upper clamp arm because extension of the jack moves the lever arm 27 upward to swing the opposite lever arm 28 downward. Such downward swinging tensions spring 29 which pulls horn 32 forming a bellcrank for the upper clamp arm. When the jack 26 is extended and the clamp arm has been swung down to engage its clamp shoe with an article on conveyor 18, as shown in FIG. 6, continued swinging of the lever 27, 28 by the jack 26 will stretch the spring 29 to increase the resilient pressure of the clamp shoe on the article even though engagement of the clamp shoe with the article prevents further swinging of the clamp arm.

Jack 26 has a double action in that its lower end is connected to one arm 33 of a lever mounted by a pivot fulcrum 34. The other end 35 of such lever carries a lower clamp shoe 36 engageable with the underside of an article 19. The position of such lower shoe can be adjusted relative to the lever 35 to accommodate articles of different depth without subjecting them to more pressure by the upper clamp shoe than is desired.

Figure 11:
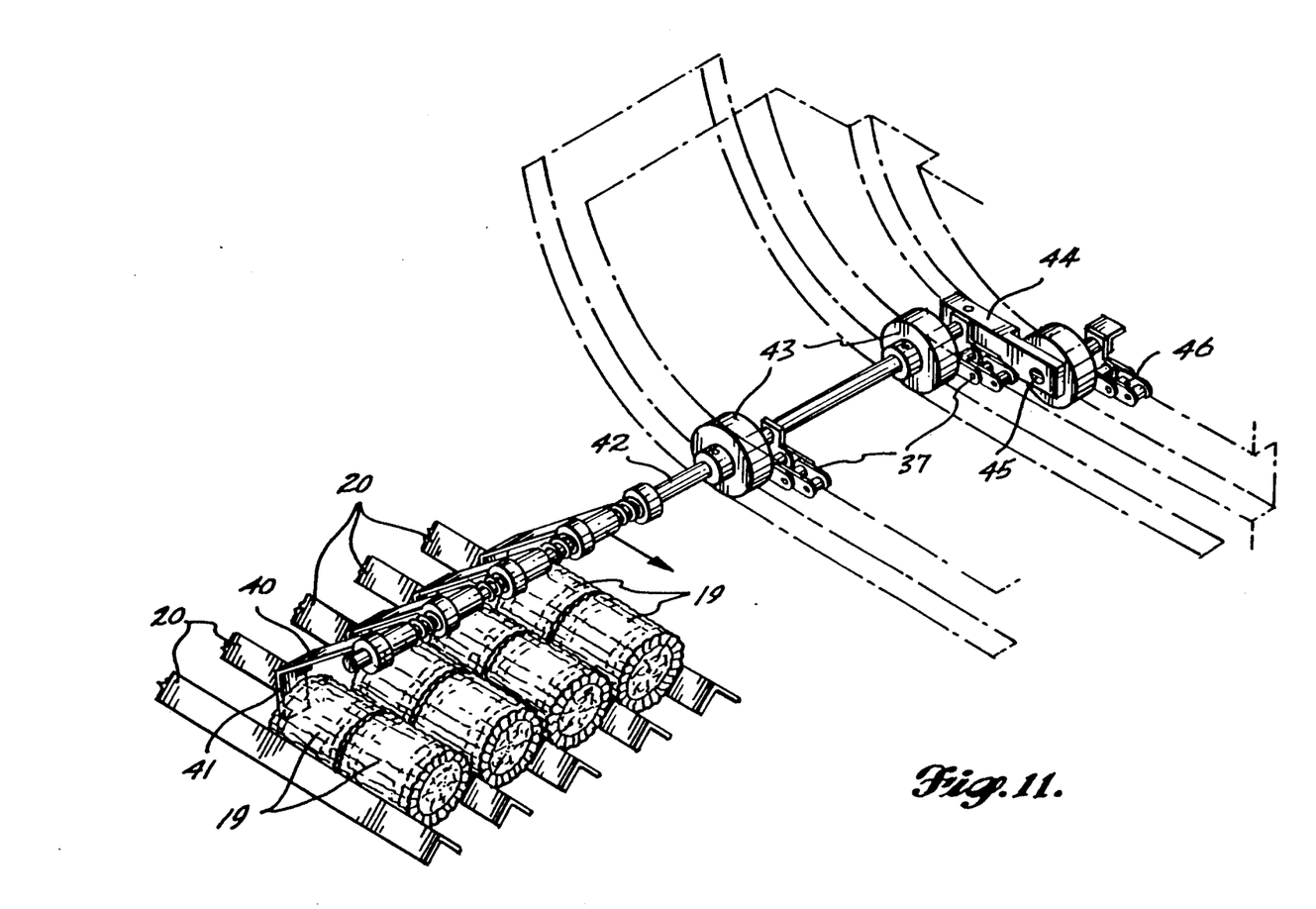
FIG. 11 is a fragmentary top perspective of a portion of the grouping mechanism of the apparatus.

When the jack 26 is contracted to release clamps 24, 36, the conveyor 18 will feed articles into the grouping mechanism. Such grouping mechanism includes an endless chain 37 extending around a sprocket 38 at one end of its loop and a sprocket 39 at the other end of its loop. Such chain carries a row of arms 40 shown best in FIG. 11 having depending group forming plates 41. As shown in FIG. 11, each row of pusher mounting arms is carried by an axle 42 having bearings 43 carried by chains 37. An arm 44 secured to rod 42 carries a pivot 45 mounted in a bearing attached to a control chain 46. The orbit of control chain 46 is offset from the orbit of chains 37 sufficiently to control the rotative position of rod 42 to maintain the arms 40 in the same attitude in all positions around the orbit, as shown in FIG. 6. The axle 47 mounting sprocket 39 is power-driven in turn to drive chains 37.

Figure 6:
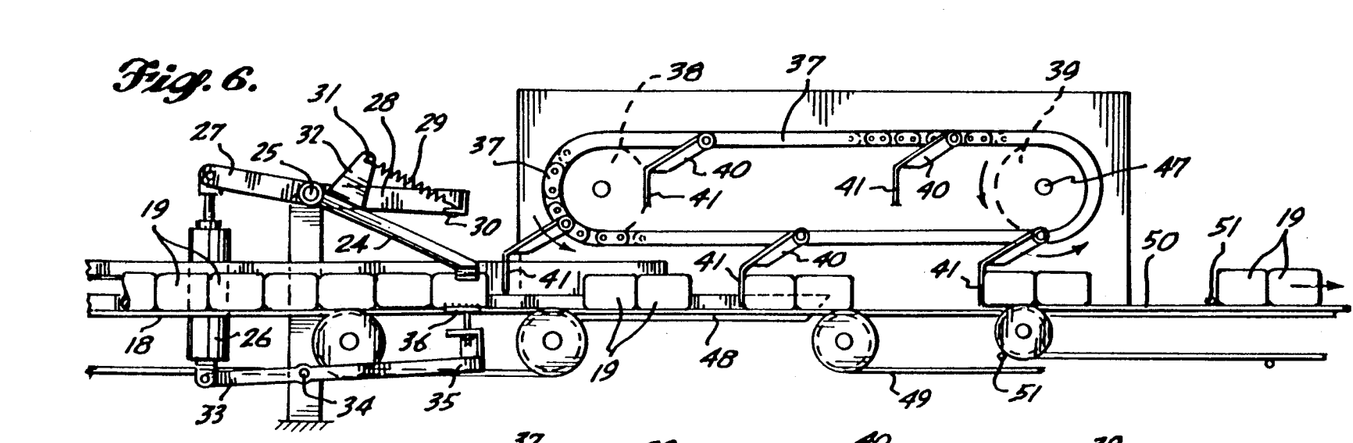
FIG. 6, FIG. 7 and FIG. 8 are somewhat diagrammatic side elevations of a different form of apparatus according to the present invention showing parts in different operating positions.

Articles moved into the group-segregating mechanism may be supported on a stationary surface 48 over which a group of articles can be moved by the group-forming plates 41, as shown in FIG. 6, until they are slid onto belt 49 and then onto outfeed belt 50 having flights 51 spaced apart sufficiently to accommodate a group of articles between them for discharge from the group-segregating apparatus.

As shown best in FIG. 7, when the clamping means 24, 36 is opened by expansion of jack 26, the infeed supply conveyor 18 will move the articles so as to press the leading article against the back side of a group forming plate 41. Such pushing will continue, as shown in FIG. 8, until the leading article of the next group is clamped by clamp means 24, 36. Conveyor 18 will continue to urge the grouped articles against the back side of the 41 until the group has been moved onto the surface 48 ready to be picked up by the next group-forming plates, as indicated in FIG. 6.

The spacing between the group-forming rods 15 shown in FIGS. 1 through 5 and the group-forming plates 41 shown in FIGS. 6 through 8 is ample to accommodate a group of even a greater number of articles than shown. Such larger group can be accommodated simply by changing the timing of engaging and disengaging the clutch driving belt 4 in FIGS. 1 through 5 and the driving of the holding belt 5, or changing the timing of the operation of jack 26 in FIGS. 6, 7 and 8 to alter the timing of operating the clamp mechanism with reference to the group-forming rods 15 in FIGS. 1 through 5 or the plates 41 in FIGS. 6, 7 and 8.

I claim:

1. Apparatus for segregating groups of articles from a line of such articles comprising segregating mechanism including an orbiting group-forming member movable along a substantially horizontal path for controlling movement of a group of articles behind it and drive means for driving said group-forming member continuously in its orbit, an infeed conveyor for moving the line of articles toward said segregating mechanism and crowding a plurality of articles against the back side of said group-forming member to form a group, clamp means engageable with the article on said infeed conveyor next behind the group to be segregated by said segregating mechanism for arresting movement of such article and further removable thereafter for releasing such article, a swingable arm supporting said clamp means for movement toward and away from such article, and means for effecting swinging of said arm to move said clamp means toward such article including fluid pressure jack means and yielding resilient pressure means for clamping such article resiliently by said clamp means.

2. The method of segregating a group of articles from a line of articles which comprises moving a first group-forming member continuously in an orbit, pushing a plurality of articles from such line against the back side of such first group-forming member while such member is thus moving continuously to form a first group to be segregated, controlling the speed of movement of such first group of articles by engagement with such first group-forming member, exerting moving force in a direction toward the first group-forming member on articles in such line behind such first group including a leading articles next behind such first group and thereby continuing to press the first group against the first continuously-moving group-forming member, clamping and thereby stopping movement of such leading article prior to its inclusion in the fist group while continuing to exert moving force on the articles ahead of such leading article for continuing to press the first group against the continuously-moving first group-forming member and thereby opening a gap between such first group and such leading article, moving a second group-forming member continuously in the same orbit as that in which the fist group-forming member moves, positioning the second group-forming member in such gap in registration with the line of articles, and thereafter releasing the clamping of such stopped leading article and moving it into engagement with the back side of the second group-forming member in forming a second group of articles located behind the second continuously-moving group-forming member.

* * * * *

UNITED STATES PATENT AND TRADEMARK OFFICE
CERTIFICATE OF CORRECTION

PATENT NO. : 5,147,027
DATED : September 15, 1992
INVENTOR(S) : Michael Cruver

It is certified that error appears in the above-identified patent and that said Letters Patent is hereby corrected as shown below:

Claim 1: Column 5, line 14, cancel "removable" and insert --movable--.

Claim 1: Column 5, line 19, cancel "yielding" and insert --yieldable--.

Claim 2: Column 6, line 7, cancel "articles" and insert --article--.

Signed and Sealed this

Nineteenth Day of October, 1993

Attest:

BRUCE LEHMAN

Attesting Officer       Commissioner of Patents and Trademarks